United States Patent [19]

Hludzinski

[11] Patent Number: 5,345,090
[45] Date of Patent: Sep. 6, 1994

[54] MANUAL CHECK READER APPARATUS WITH OPTICAL IMAGING

[75] Inventor: Stanley J. Hludzinski, Auburn, Calif.
[73] Assignee: Verifone, Inc., Redwood City, Calif.
[21] Appl. No.: 27,344
[22] Filed: Mar. 8, 1993
[51] Int. Cl.⁵ .............................................. G06K 7/10
[52] U.S. Cl. ................................. 250/566; 235/482
[58] Field of Search ............ 250/569, 568, 566, 222.1, 250/239; 235/454, 482, 483, 485, 462, 468

[56] References Cited

U.S. PATENT DOCUMENTS

| | | | |
|---|---|---|---|
| 4,277,689 | 7/1981 | Thomas et al. | 235/482 |
| 4,593,328 | 6/1986 | Baus, Jr. | 235/482 |
| 4,788,420 | 11/1988 | Chang et al. | 235/483 |
| 5,034,619 | 7/1991 | Hammond, Jr. | 250/569 |

*Primary Examiner*—David C. Nelms
*Assistant Examiner*—K. Shami
*Attorney, Agent, or Firm*—Lowell C. Bergstedt

[57] ABSTRACT

Optical reader apparatus for reading data on a data carrier. A housing defines a data carrier slot having an optical data window at a prearranged position. An optical reading means is mounted within the housing for reading data scanned past the optical data window. A door assembly is mounted in a hinged relation to the housing means opposite the optical read window. The door has closed and open positions and permits access to the optical data window in the open position. The door assembly carries a resilient pressure spring. The resilient pressure spring urges a data carrier passing through the data carrier slot into optical reading contact with the optical data window. The door assembly mounts the resilient spring member within a frame for easy removability. The resilient pressure spring carries an optical compensation member on a forward surface thereof so that the optical compensation member is presented to the optical data window when a data carrier is not present.

12 Claims, 5 Drawing Sheets

MANUAL CHECK READER APPARATUS WITH OPTICAL IMAGING

FIELD OF THE INVENTION

This invention relates generally to optical reader apparatus for reading optically coded data on a data carrier and, more specifically, to an optical reader for the MICR data on a bank check or other paper instrument.

PRIOR ART BACKGROUND

Most of the check readers on the market utilize magnetic reader technology which operates to detect the magnetic ink patterns that are incorporated in the MICR data line on a check. Optical readers have also been developed, but these generally involve automatic scanning of the check past an optical reader assembly and the optical reader assembly is typically a complex combination of optical components which is difficult to assemble and requires calibration to provide reliable performance.

OBJECTS OF THIS INVENTION

It is a principal object of this invention to provide an improved optical reader apparatus.

It is a specific object of this invention to provide an improved apparatus for optical reading of the MICR line on checks which are hand swiped through the apparatus.

It is another object of this invention to provide an optical reader apparatus which is easy to clean.

It is another object of this invention to provide an optical reader apparatus which is inexpensive and easy to assemble and requires no complicated optical alignment procedures.

FEATURES AND ADVANTAGES OF THIS INVENTION

One aspect of this invention features optical reader apparatus for reading data on a data carrier and having a housing means defining a data carrier slot having an optical data window at a prearranged position within the data carrier slot. An optical reading means is mounted within the housing for reading data scanned past the optical data window. A door assembly is mounted in a hinged relation to the housing means opposite the optical data window and has closed and open positions. In the open position, the door permits access to the optical data window for cleaning and maintenance. The door assembly carries a resilient pressure spring having a forward surface defining a portion of a data carrier slot opposite the optical data window in the closed position of the door assembly. This resilient pressure spring urges a data carrier passing through the data carrier slot into optical reading contact with the optical data window.

These features of this invention provide ease of cleaning the assembly, including the optical data window. Ensuring a clean data window together with use of the pressure spring to give good reading contact improves the accuracy and reproducibility of data reading performance.

Preferably, the resilient pressure spring is removably mounted to the door member and carries an optical compensation member on a forward surface thereof with the forward surface of the optical compensation member being presented to the optical data window in absence of a data carrier in the data carrier slot. This combination assures that the spring member and the compensation member can be easily cleaned or replaced when required to maintain reliable operation of the unit.

In a preferred embodiment, the optical reading means comprises an optical housing formed by precision molding and having a base and a superstructure above the base for supporting optical components, with a cover element mounted over the superstructure after the optical components have been mounted therein. The superstructure has a forward mounting slot carrying an optical window member therein. A pair of side apertures adjacent the forward mounting slot admit a pair of illumination means to shine on and through the optical window to illuminate the data carrier. A central slot in the superstructure carries an aperture member and a lens member, and a rearward mounting flange has a detector window therein and carries an optical detector assembly thereon.

This optical housing and cover are preferably mounted on a printed wire board with a pair of pilot bosses formed on the bottom of the base cooperating with pilot holes formed in the printed wire board to locate the optical housing at a prearranged position on the printed wire board. The illumination means are mounted on the printed wire board adjacent the base portion of the optical housing.

In this preferred embodiment, the optical housing has an optical axis defined by the optical window member, the aperture member and the lens member. The optical detector assembly comprises a second printed wire board, a semiconductor optical detector chip bonded thereon in a precisely registered location, and an optical cover mounted over the chip. The chip has an optical center point defined at the intersection of a pair of orthogonal optical center lines. The rearward mounting flange of the optical housing has a pair of pilot bosses formed thereon and the second printed wire board having a pair of cooperating pilot apertures therein for locating the second printed wire board in a predefined position on the mounting flange so that the optical center point of the chip is registered with the optical axis of the optical housing.

In accordance with another feature of this invention, the housing means comprises a base member and a cover member which mounts over the base member to produce a complete housing unit. The cover member is molded with the data carrier slot integral therewith and adjacent one edge thereof and the data carrier slot has an optical data window formed in an inside center location thereof and a door mounting opening formed in an outside location opposite the optical data window. Preferably, the invention utilizes an optical reading means which comprises a printed wire board adapted to mount at a prearranged position within the base member of the housing unit. An optical reader assembly is mounted at a prearranged location on the printed wire board and has a data input end which is received in the optical data window formed in the data carrier slot of the cover member when the cover member is mounted over the base member.

In a preferred embodiment utilizing this feature of the invention, the optical reader assembly comprises essentially the arrangement of components previously described.

Another aspect of this invention features an optical reader apparatus for reading MICR data on a check. In this apparatus a housing means defines a check transit slot having an optical data window at a prearranged position within the check transit slot. The check transit slot is adapted for hand swiping of a check therethrough. An optical reading means is mounted within the housing for reading MICR data scanned on a check passing by the optical data window. The housing means comprises a base member and a cover member which mounts over the base member to produce a complete housing unit. The cover member is molded with the check transit slot integral therewith and adjacent one edge thereof. The check transit slot has the optical data window formed in an inside center location thereof.

Preferably, the optical reading means comprises a printed wire board adapted to mount at a prearranged position within the base member of the housing unit, and an optical reader assembly mounted at a prearranged location on the printed wire board. The optical reader has a data input end received in the optical data window formed in the check transit slot of the cover member when the cover member is mounted over the base member with the printed wire board mounted thereon.

More particularly, in a preferred embodiment, the optical reader assembly comprises an optical housing formed by precision molding and has a base portion, a superstructure extending above the base portion for supporting optical components, and a cover member mounted over the superstructure for sealing the optical components in the superstructure. The superstructure defines a data input end and a data output end thereof and has a mounting frame portion formed at the data input end. This mounting frame portion carries an optical window member in a prearranged slot therein and is formed to be received in the optical data window of the check transit slot.

The superstructure further has a central slot formed therein between the data input end and the data output end and carrying an aperture member and a lens member. A mounting flange is formed at the data output end with a detector window formed therein and carrying an optical detector assembly on the mounting flange.

The optical housing has a pair of illumination windows located behind the mounting frame portion for receiving a pair of illumination means to shine light through the optical window on a check passing through the check transit slot.

The base portion of the optical housing has a pair of pilot bosses formed on a bottom surface thereof and these pilot bosses cooperate with a pair of pilot holes in the printed wire board to define the prearranged mounting location for the optical reader assembly on the printed wire board. A pair of illumination means are mounted in prearranged locations on the printed wire board so as to be received in the illumination windows of the optical housing when the optical reader assembly is mounted on the printed wire board.

The optical housing has an optical axis defined by the optical window member, the aperture member and the lens member. The optical detector assembly carried on the mounting flange at the data output end comprises a second printed wire board, a semiconductor optical detector chip bonded on the printed second printed wire board in a precisely registered location, and an optical cover mounted over the chip. The chip has an optical center defined at the intersection of a pair of orthogonal optical center lines. The mounting flange has a pair of pilot bosses formed thereon and the second printed wire board has a pair of cooperating pilot apertures therein for locating the second printed wire board in a predefined position on the mounting flange so that the optical center point of the chip is registered with the optical axis of the optical housing, the mounting flange and the second printed wire board have at least one pair of cooperative screw holes for receiving a mounting screw to fasten the printed wire board on the mounting flange.

The advantage of this type of optical assembly is that the optical elements are aligned already in the optical detector assembly and no complex jigging or fixturing is required to achieve optical alignment as would be true of an arrangement in which each component is mounted separately. The overall assembly of the unit is simple and can be done with a single screwdriver. This reduces overall manufacturing cost of the unit but achieves good optical reader performance.

Other objects, features and advantages of this invention will be apparent from a consideration of the detailed description set forth hereafter in conjunction with the accompanying drawings.

DESCRIPTION OF PREFERRED EMBODIMENT

Figure 1:
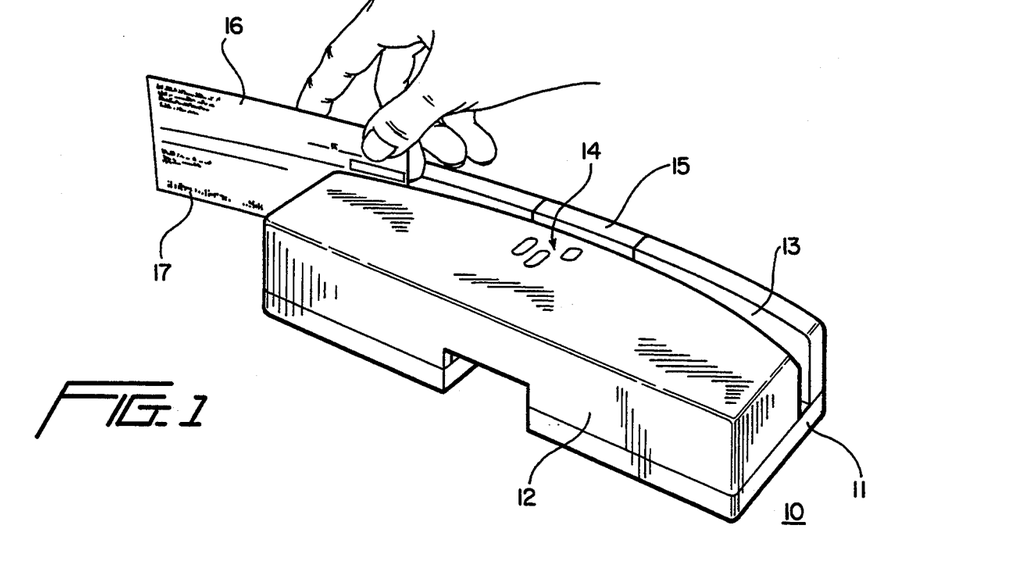
FIG. 1 is a perspective view of an optical reader apparatus in accordance with this invention.

FIG. 1 shows an embodiment of an optical reader apparatus in the form of a reader 10 for reading the MICR data line 17 on a check 16 which is manually swiped through check transit slot 13. It will be appreciated that the more general case of the invention would involve reading a line of optically encoded data on any data carrier. The data could be alphanumeric characters as in the MICR line on a check or a bar code on a coupon. These are some examples of optically encoded data, but the invention is not limited to these examples.

Reader 10 has a housing comprised of a base member 11 and a cover member 12. Cover member 12 has check transit slot 13 integrally formed as part of its structure during the molding process. Check transit slot 13 is purposely given a curved configuration for reasons which are discussed in co-pending Sasaki et al. U.S. patent application Ser. No. 07/805,846, filed Dec. 10, 1991. An indicator light arrangement 14 is provided in a top surface of cover member 12. This invention is not limited to such a curved slot configuration but could also use a straight slot.

Figure 2:
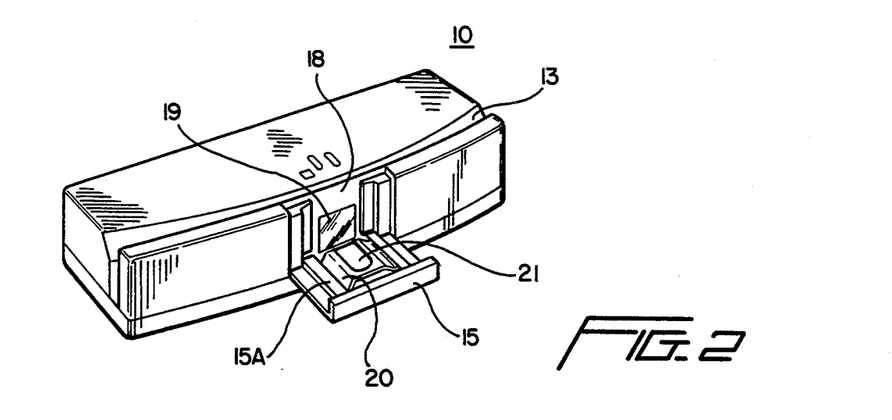
FIG. 2 is another perspective view of an optical reader apparatus in accordance with this invention showing the features of the access door to the reading station of the unit.

As shown in FIG. 2 an optical reading station 18 has an optical data window 19 therein. Opposite optical reading station 18 is a hinged door assembly 15 which has a closed position as shown in FIG. 1 and an open position as shown in FIG. 2. The open position of door 15 permits cleaning of the optical data window 19 and the check transit slot 13 at reading station 18.

Figure 4:
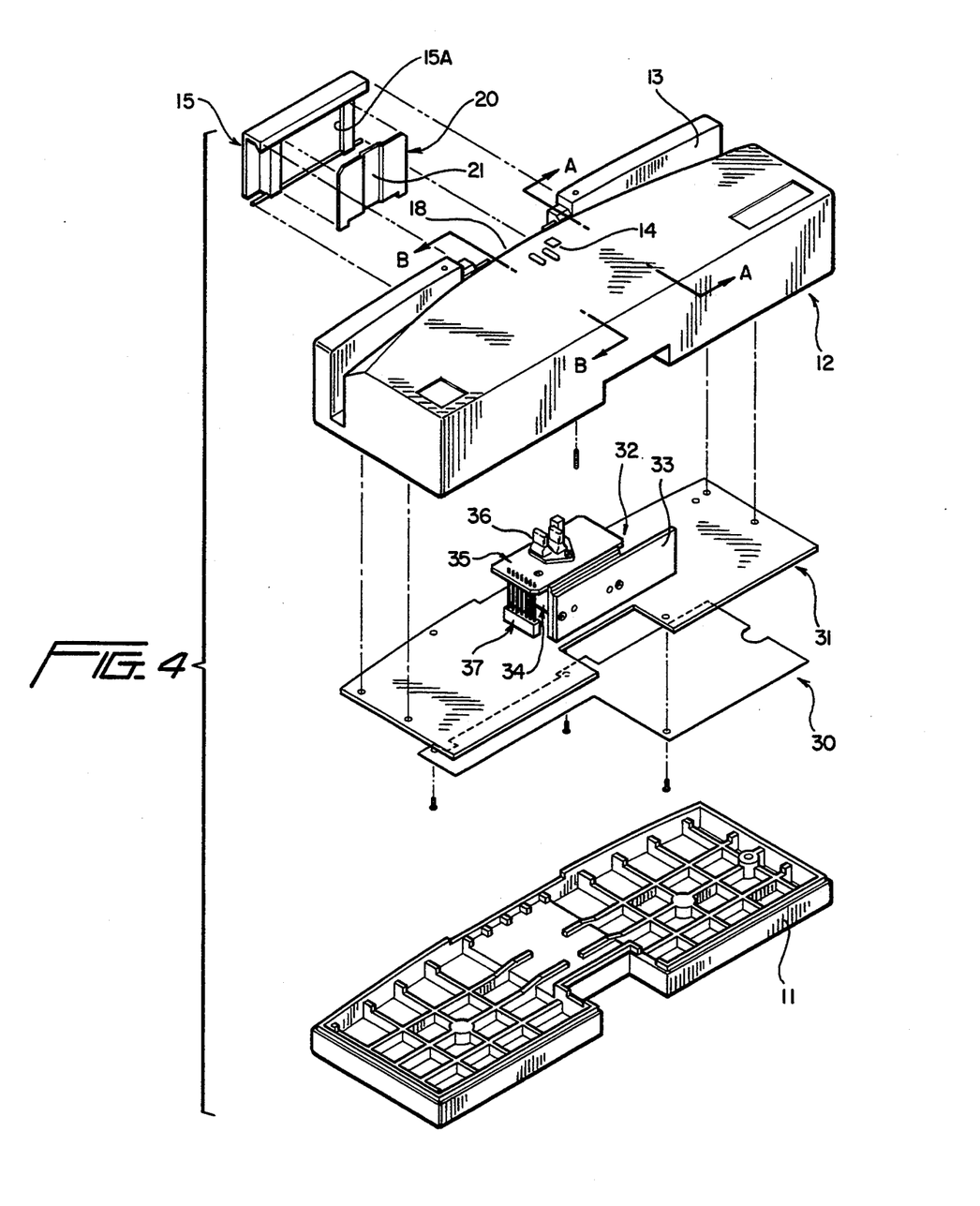
FIG. 4 is an exploded perspective view showing the major assemblies of an optical reader apparatus in accordance with this invention.

A pressure spring 20 is carried in a bracket 15A on the inside of door assembly 15. Pressure spring 20 is preferably formed from Teflon to provide a smooth low friction surface. The function of pressure spring 20 is to urge the check portion transiting the check transit slot into contact with the surface of optical data window 19. A compensation surface 21 is carried on a central portion of pressure spring 20 if needed as a white background for operation of the optical detector device. As shown in FIG. 4, pressure spring 20 is mounted so that it can be easily removed for replacement of compensation member 21 or for replacement of the spring itself.

Figure 3:
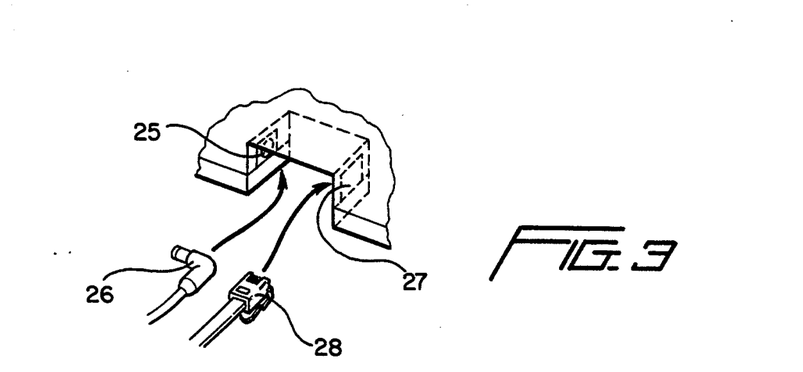
FIG. 3 is a partial view showing the power and data line hookups to the optical reader apparatus of FIGS. 1 and 2.

As shown in FIG. 3, a power coupler 25 receives a power plug 26 leading from a D.C. power supply to power reader 10. A serial data coupler in the form of a female phone jack 27 receives a male phone jack 28 to provide data communication between the reader 10 and other devices such as point of sale terminals and electronic cash registers. The electronics of the reader are not a part of this invention and will not be described.

FIG. 4 illustrates the various components of reader 10 and the manner of its assembly. Cover member 12 mounts on top of base member 11 after a first printed wire board assembly 31 with shield 30 are placed on base member 11. Printed wire board assembly 31 carries an optical reader assembly 32 thereon. Optical reader assembly 32 includes an optical image processing sub-assembly 33 and an optical image forming sub-assembly 34. An indicator light sub-assembly 35 is mounted over optical reader assembly 32 and includes a light pipe unit 36 with top portions received in indicator light apertures 14 in the cover unit. A connector arrangement 37 connects indicator light assembly 35 to circuitry on printed wire board 31.

Figure 5:
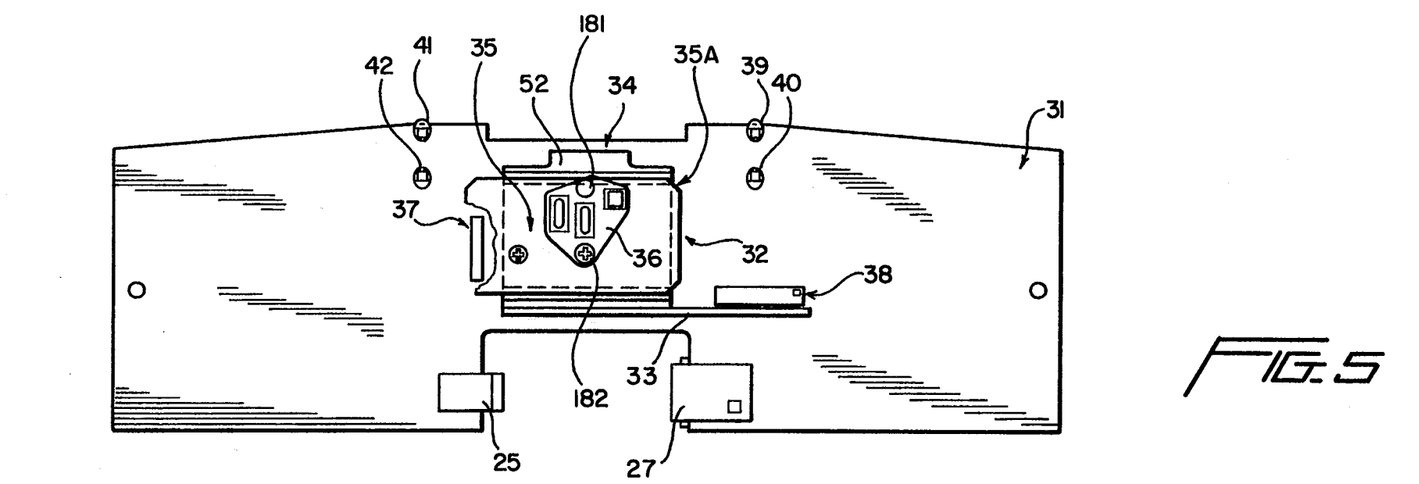
FIG. 5 is a top view of an optical reader assembly useful in optical reader apparatus in accordance with this invention.

Referring now to FIGS. 5 through 14, the details of one embodiment of the invention will be described. FIG. 5 shows that optical sub-assembly 34 is mounted in a central location of printed wire board 31. The details of optical sub-assembly 34 are shown in FIGS. 7 through 11 and 14. An precision molded optical housing 34A is formed by base 50, superstructure 51 and cover 52.

Figure 11:
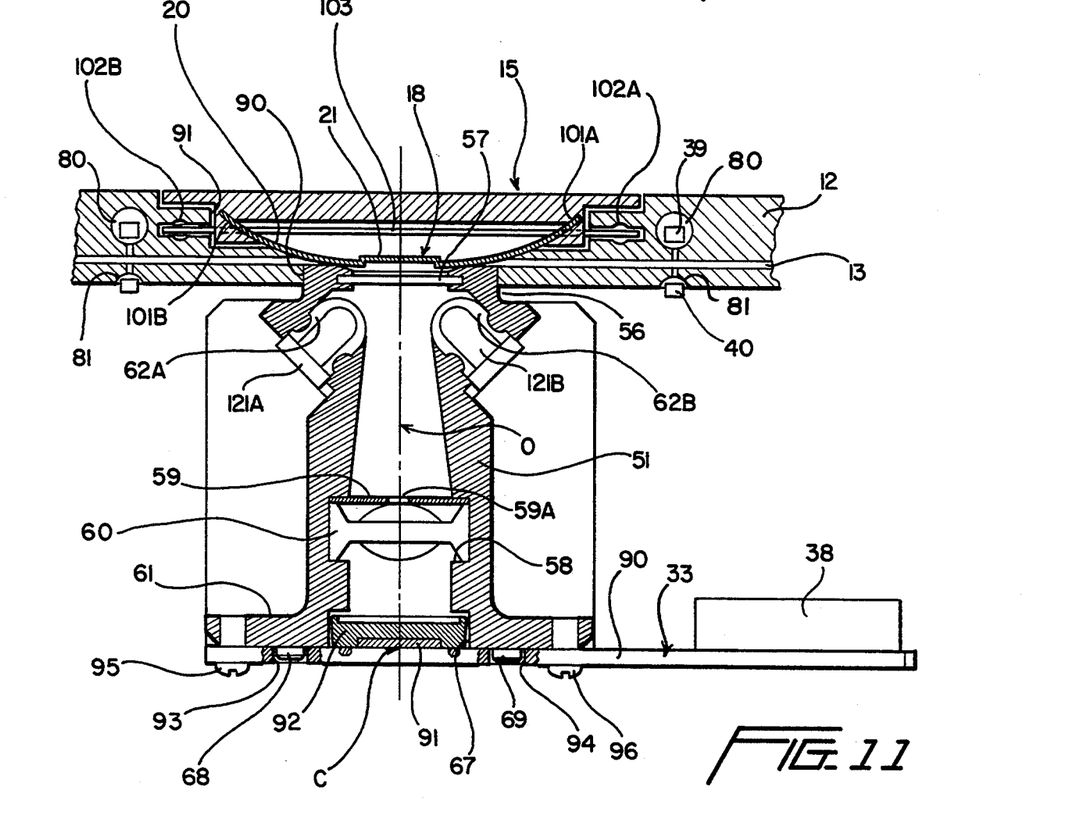
FIG. 11 is a top section view of important elements of an optical assembly in a preferred embodiment of apparatus in accordance with this invention.

Superstructure 51 has a data input end 54 and a data output end 55. A mounting frame portion 56 is provided at data input end 54 and receives an optical window 57 which is a section of plate glass. Mounting frame portion 56 is received in the optical data window 90 formed in the inner wall of the check transit slot 13 as shown in FIG. 11 with the optical data window opening shown best in FIG. 13 before mounting over optical housing 34A. This housing is formed from a black plastic material to block entry of light except through the data input window thereof.

A central slot 58 in superstructure 51 receives both an aperture plate 59 and a lens element 60. Aperture plate 59 has a central aperture 59A therein. Mounting flange 61 formed at data output end 55 has a central detector window 67 formed therein. Optical detector assembly 33 is carried on mounting flange 61 as best shown in FIG. 11. Optical detector assembly 33 comprises a printed wire board 90 on which is die bonded a semiconductor optical detector chip 91 having an optical cover 92 mounted thereover to hermetically seal the optical detector chip. Printed wire board 90 is mounted on flange 61 using a pair of pilot bosses 68,69 on the back of flange 61 which cooperate with pilot holes 93,94 on printed wire board 90 to locate chip 91 and cover 92 in a prearranged position within data output window 67.

Figure 14:
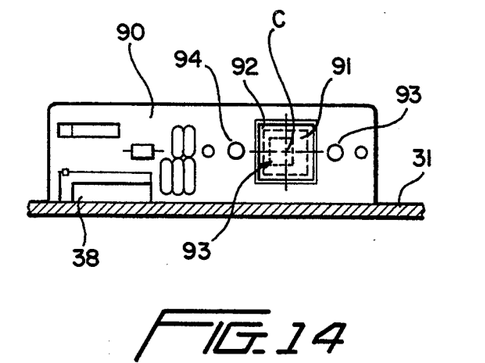
FIG. 14 is a front elevational view of the optical detector assembly useful in optical reader apparatus in accordance with this invention.

An optical axis O is defined by data window 57, aperture member 59 and lens 60. Chip 91 (as shown in FIG. 14) has an optical center point C which is aligned with the optical axis O by this mounting arrangement. The precision molded optical housing 34A together with precision mounting of chip 91 on printed wire board 90 and precision location of printed wire board 90 on mounting flange 61 gives automatic optical alignment without use of jigs or fixtures in the assembly operation. Low cost, high performance optical imaging of the MICR line is achieved in this manner.

Illumination windows 62A and 62B located behind mounting frame portion 56 admit a pair of illumination means 121A and 121B which are mounted on printed wire board 31. These illumination means preferably each comprise a stacked pair of infrared LEDs to provide adequate illumination of data reading station 18.

Figures 7, 8, 9, 10:
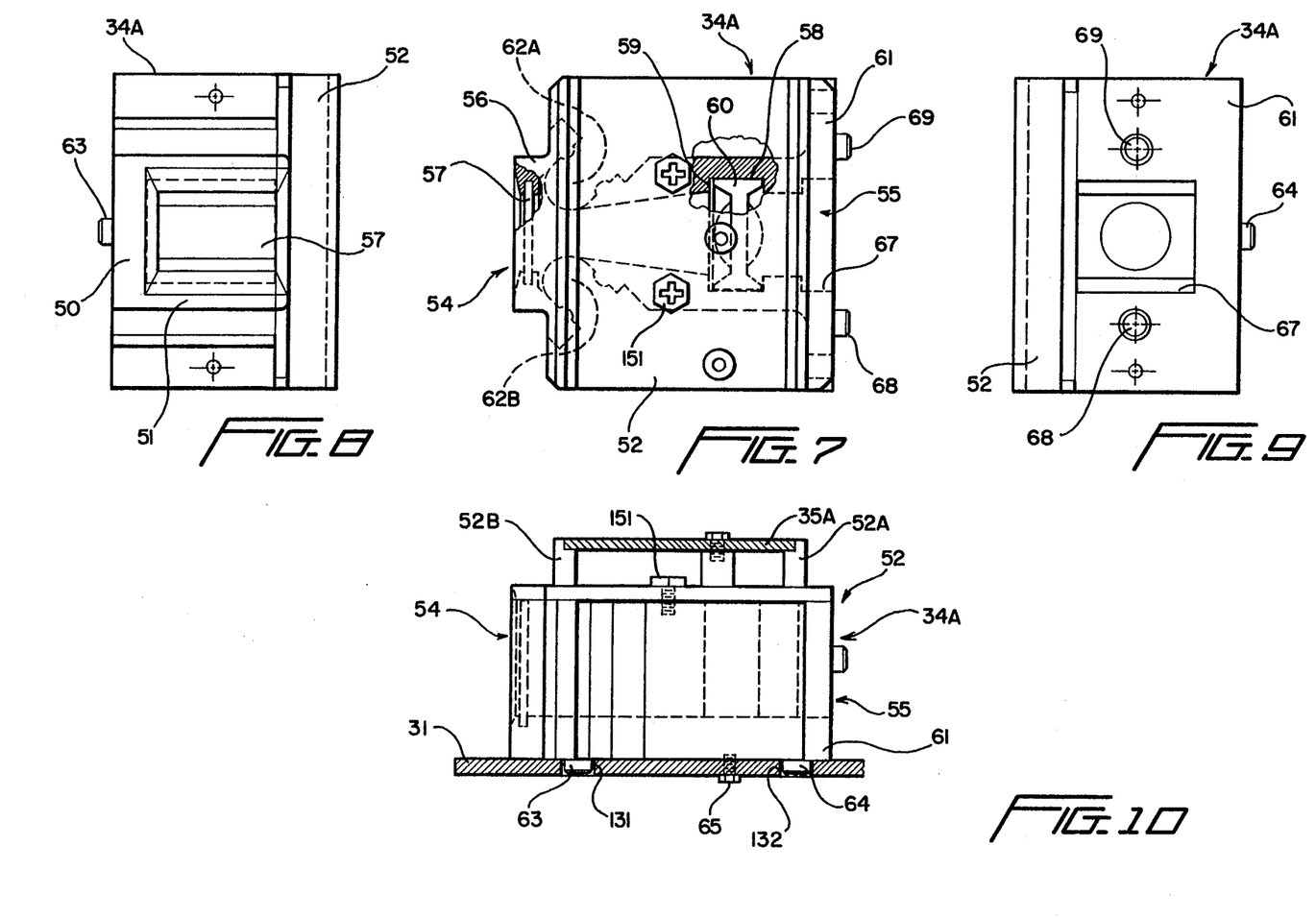
FIG. 7 is partially sectioned top view of an optical assembly useful in optical reader apparatus in accordance with this invention.
FIG. 8 is a front elevational view of the optical assembly of FIG. 7.
FIG. 9 is a rear elevational view of the optical assembly of FIG. 7.
FIG. 10 is a side elevational view of the optical assembly of FIG. 7.

As shown in FIG. 10 optical housing assembly 34A is mounted to printed wire board 31 using a pair of pilot bosses 63,64 on the underside of base portion 61 and a pair of cooperating pilot holes 131,132 in printed wire board 31 to provide accurate positioning. A mounting screw 65 fastens the optical housing assembly 34A to printed wire board 31.

Figure 6:
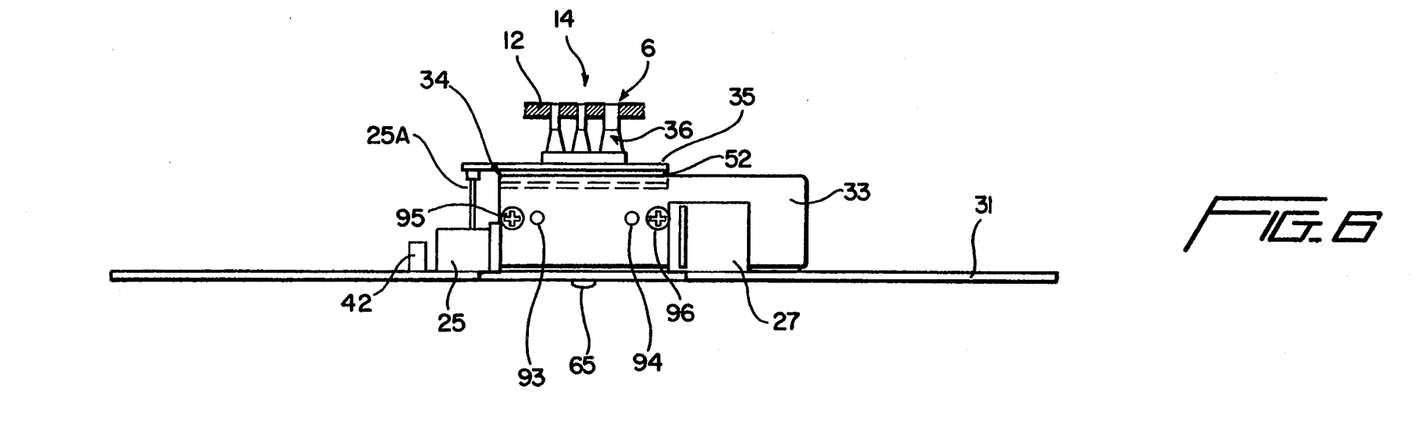
FIG. 6 is a rear elevational view of the optical reader assembly shown in FIG. 5.

Cover 52 is mounted to superstructure 51 using a pair of mounting screws 151. Cover 52 has a pair of brackets 52A,52B for mounting printed wire board 35A of optical indicator assembly 35 as shown in FIG. 10. As shown in FIGS. 5 and 6, light pipe assembly 36 mounts on printed wire board 35A which has an arrangement of different color LEDs provided thereon at positions which register with the individual light pipe elements shown. A pilot boss and pilot hole arrangement 181 and a screw and screw hole arrangement 182 provide the positioning and fastening of light pipe assembly 36 on printed wire board 35A. FIG. 6 shows how the individual light pipe elements extend through apertures in cover member 12 to provide the indicator light arrangement 14.

Referring to FIGS. 5 and 11, a pair of light emitters 40, 42 and light detectors 39,41 are mounted on printed wire board 31. The mounting position of these elements is arranged so that they fit into recesses like the recesses 80,81 shown in FIG. 11 when cover member 12 is mounted over printed wire board 31. These light emitting and light detecting elements communicate with each other through check transit slot 13 when a check is not blocking the light. The interruption of the light is used to indicate the arrival of the edge of a check at that point of the check transit slot. This signal is used to trigger the optical detector circuitry to begin capturing image data for purposes of capturing MICR line data for decoding. In this particular embodiment, the optical detector chip and associate circuitry and software utilizes a neural network technology which is obtained from Synaptics Inc. of San Jose, Calif. The details of the image capture and image processing are not part of this invention and will not be discussed. The invention is not limited to use of neural network chips or any particular type of image detection arrangement.

Figure 12:
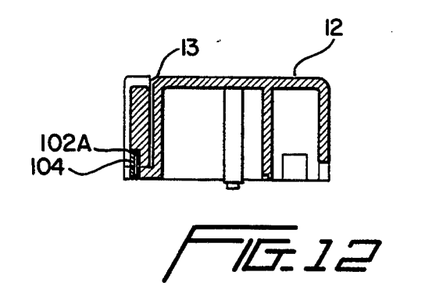
FIG. 12 is a section view of a cover portion of the housing taken along the viewing line A—A shown in FIG. 4.
Figure 13:
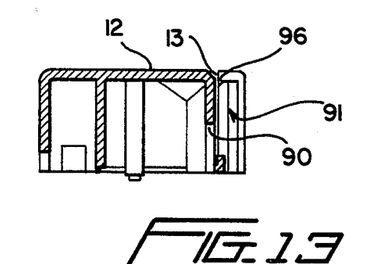
FIG. 13 is a section view of a cover portion of the housing taken along the viewing line B—B shown in FIG. 4.

FIG. 11 together with FIGS. 12 and 13 illustrates the manner in which door assembly 15 is hingedly mounted to housing cover 12. A door receiving opening 91 is formed in housing cover 12 across from data reading station 18 of check transit slot 13. Adjacent this opening 91 on each end is a slot and aperture combination 102A, 102B with a compression spring 104 received in each aperture and a hinge pin 103 on the bottom of door 15 received in the slot. Door 15 is shaped such that the underside of the top surface has a lip thereon which fits into a recess 96 shown in FIG. 13. The compression springs 104 bias the lip on the door into the recess 96 to latch the door closed. To open the door, it is pulled upwards against the spring pressure to remove the lip from the recess and the door is then free to rotate on the hinge pin 103. The edge portion of base 11 which underlies the hinge pin 103 keeps the hinge pin in the slot after the cover and door assembly are mounted over the base.

The assembly steps for the optical reader apparatus of this invention will now be discussed. The compensation decal 21 is mounted to resilient pressure spring 20 and then pressure spring 20 is mounted in the bracket 15A, shown more particularly as bracket members 101A and 101B in FIG. 11. Door assembly 15 is then assembled to cover member 12. Two compression springs are dropped into the holes 102A, 102B with cover 12 turned upside down, and then hinge pin 103 is placed in the slots and the door pulled and rotated until latched with the lip in the recess as previously described.

The optical assembly 34 is put together by first mounting the detector subassembly 33 on mounting flange 61 using the pilot boss and pilot hole arrangement to locate it accurately. Then it is fastened using the screws 95,96. The optical housing 34 is preassembled with the cover in place. This optical housing with the detector subassembly in place thereon is then mounted on printed wire board 31. Connector 38 is pushed into a corresponding connector on printed wire board 31 as the assembly is pushed toward the surface of the printed wire board so that pilot bosses 63,64 enter pilot holes 131,132 and LEDs 121A, 121B enter the apertures 62A,62B. Then mounting screw 65 is then used to fasten the optical components to the printed wire board.

The indicator assembly is then mounted to the top of the optical housing by pushing the connector pins 25A into connector 25 as printed wire board 35A is pushed down into standoff brackets 52A, 52B. Then light pipe arrangement 36 is mounted over the printed wire board 35A as previously described. This overall assembly is then placed in the base portion of the housing and the cover is assembled over it with the data window in the check transit slot fitting over the frame mounting portion of the optical housing. The cover is then fastened to the base with a couple of mounting screws and the assembly is complete.

It should be appreciated from the above description that the the optical reader apparatus of this invention provides the advantage of a hinged reading station door to facilitate cleaning or replacement of the components at reading station 18. The combination of the hinged door and pressure spring member mounted thereto give good control of the position of the check portion being presented to the data input window as a check is scanned through the check transit slot. The self-jigging arrangement of the optical components achieved though use of a precision molded housing and the mounting arrangements discussed above provides ease of assembly in combination with good optical imaging performance for reliable operation.

It should be understood that, while a specific embodiment of the invention has been described above, persons of skill in this art could make numerous modifications without departing from the principles of the invention. For example, it should be apparent that this optical components and mounting arrangements could easily be adapted to an automatic check handling system in which a check scanning mechanism receives the check and scans it past the reading station. The hinged door arrangement could be employed with other types of optical reader components. Instead of mounting the optical reader assembly 34 on the printed wire board 31 it could be separately mounted as a unit to the base member of the unit with the circuitry on detector subassembly 33 connected to a printed wire board though a flexible cable. In this case the LEDs 121A and 121B could be assembled to the superstructure 51 of the optical housing and connected to a printed wire board via wires and connectors. Each of these modifications detracts to some extent from the low cost design and assembly of the preferred embodiment, but would be within the general principles of the invention and achieve most of the advantages thereof.

Accordingly, the scope of this invention is not limited to the embodiments shown and described, and reference is made to the claims set forth below to define the scope of the invention.

What is claimed is:

1. Optical reader apparatus for reading data on a data carrier and comprising:

housing means defining a data carrier slot having an optical data window at a prearranged position within said data carrier slot;

optical reading means mounted within said housing for reading data scanned past said optical data window;

a door assembly mounted in a hinged relation to said housing means opposite said optical read window and having closed and open positions and permitting access to said optical data window in said open position, said door assembly carrying a resilient pressure spring having a forward surface defining a portion of a data carrier slot opposite said optical data window in said closed position of said door assembly, and said resilient pressure spring urging a data carrier passing through said data carrier slot into optical reading contact with said optical data window.

2. Apparatus as claimed in claim 1, wherein said door assembly mounts said resilient spring member with a frame for easy removability, and said resilient pressure spring carries an optical compensation member on a forward surface thereof with the forward surface of said optical compensation member being presented to said optical data window in absence of a data carrier in said data carrier slot.

3. Apparatus as claimed in claim 2, wherein said optical reading means comprises an optical housing formed by precision molding and having a base and a superstructure above said base for supporting optical components, said superstructure having a forward mounting slot carrying an optical window member therein, a pair of side apertures adjacent said forward mounting slot admitting a pair of illumination means to shine on and through said optical window, a central slot carrying an aperture member and a lens member, and a rearward mounting flange having a detector window therein and carrying an optical detector assembly thereon; and a cover element mounted over said superstructure;

said optical housing and cover being mounted on a printed wire board with a pair of pilot bosses formed on the bottom of said base cooperating with pilot holes formed in said printed wire board to locate said optical housing thereon;

said illumination means being mounted on said printed wire board adjacent said base portion of said optical housing.

4. Apparatus as claimed in claim 3, wherein said optical housing has an optical axis defined by said optical window member, said aperture member and said lens member;

said optical detector assembly comprises a second printed wire board, a semiconductor optical detector chip bonded thereon in a precisely registered location, and an optical cover mounted over said chip, said chip having an optical center point defined at the intersection of a pair of orthogonal optical center lines;

said rearward mounting flange of said optical housing having a pair of pilot bosses formed thereon and said second printed wire board having a pair of cooperating pilot apertures therein for locating said second printed wire board in a predefined position on said mounting flange so that the optical center point of said chip is registered with said optical axis of said optical housing.

5. Apparatus as claimed in claim 1, wherein said housing means comprises a base member and a cover member which mounts over said base member to produce a complete housing unit, said cover member being molded with said data carrier slot integral therewith and adjacent one edge thereof, said data carrier slot having an optical data window formed in an inside center location thereof and a door mounting opening formed in an outside location opposite said optical data window;

said optical reading means comprises a printed wire board adapted to mount at a prearranged position within said base member of said housing unit, and an optical reader assembly mounted at a prearranged location on said printed wire board and having a data input end received in said optical data window formed in said data carrier slot of said cover member when said cover member is mounted over said base member.

6. Apparatus as claimed in claim 5, wherein said optical reader assembly comprises:

an optical housing formed by precision molding and having a base portion and a superstructure above said base portion for supporting optical components and a cover member mounted over said superstructure after said optical components have been placed therein;

said superstructure defining a data input end and a data output end thereof and having a mounting frame portion formed at said data input end and carrying an optical window member in a prearranged slot therein, said mounting frame portion being formed to be received in said optical data window of said data carrier slot, said superstructure further having a central slot formed therein between said data input end and said data output end and carrying an aperture member and a lens member, said superstructure further having a mounting flange formed at said data output end with a detector window formed therein and carrying an optical detector assembly on said mounting flange, said optical housing having a pair of illumination windows located behind said mounting frame portion for receiving a pair of illumination means to shine light on and through said optical window, said base portion having a pair of pilot bosses formed on a bottom surface thereof and cooperating with a pair of pilot holes in said printed wire board to define said prearranged mounting location for said optical reader assembly on said printed wire board, a pair of illumination means being mounted in prearranged locations on said printed wire board so as to be received in said illumination windows of said optical housing when said optical reader assembly is mounted thereon.

7. Apparatus as claimed in claim 6, wherein said optical housing has an optical axis defined by said optical window member, said aperture member and said lens member;

said optical detector assembly carried on said mounting flange at said data output end comprises a second printed wire board, a semiconductor optical detector chip bonded on said printed second printed wire board in a precisely registered location, and an optical cover mounted over said chip, said chip having an optical center defined at the intersection of a pair of orthogonal optical center lines;

said mounting flange having a pair of pilot bosses formed thereon and said second printed wire board having a pair of cooperating pilot apertures therein for locating said second printed wire board in a predefined position on said mounting flange so that the optical center point of said chip is registered with said optical axis of said optical housing.

8. Optical reader apparatus for reading MICR data on a check, said apparatus comprising:

housing means defining a check transit slot having an optical data window at a prearranged position within said check transit slot, said check transit slot being adapted for hand swiping of a check therethrough; and optical reading means mounted within said housing for reading MICR data scanned on a check passing by said optical data window;

said housing means comprising a base member and a cover member which mounts over said base member to produce a complete housing unit, said cover member being molded with said check transit slot integral therewith and adjacent one edge thereof, said check transit slot having said optical data window formed in an inside center location thereof; and said optical reading means comprises
- a printed wire board adapted to mount at a prearranged position within said base member of said housing unit, and
- an optical reader assembly mounted at a prearranged location on said printed wire board and having a data input end received in said optical data window formed in said check transit slot of said cover member when said cover member is mounted over said base member with said printed wire board mounted thereon;

said optical reader assembly comprising:
- an optical housing formed by precision molding and having a base portion, a superstructure extending above said base portion for supporting optical components, and a cover member mounted over said superstructure for sealing said optical components in said superstructure;
- said superstructure defining a data input end and a data output end thereof and having a mounting frame portion formed at said data input end, said mounting frame portion carrying an optical window member in a prearranged slot therein, said mounting frame portion being formed to be received in said optical window of said check transit slot,
- said superstructure further having a central slot formed therein between said data input end and said data output end and carrying an aperture member and a lens member,
- said superstructure further having a mounting flange formed at said data output end with a detector window formed therein and carrying an optical detector assembly on said mounting flange,
- said optical housing having a pair of illumination windows located behind said mounting frame portion for receiving a pair of illumination means to shine light through said optical window on a check passing through said check transit slot;
- said base portion having a pair of pilot bosses formed on a bottom surface thereof and cooperating with a pair of pilot holes in said printed wire board to define said prearranged mounting location for said optical reader assembly on said printed wire board;
- a pair of illumination means being mounted in prearranged locations on said printed wire board so as to be received in said illumination windows of said optical housing when said optical reader assembly is mounted thereon.

9. Apparatus as claimed in claim 8, wherein said optical housing has an optical axis defined by said optical window member, said aperture member and said lens member;

said optical detector assembly carried on said mounting flange at said data output end comprises
- a second printed wire board,
- a semiconductor optical detector chip bonded on said printed second printed wire board in a precisely registered location, and
- an optical cover mounted over said chip,
- said chip having an optical center defined at the intersection of a pair of orthogonal optical center lines;
- said mounting flange having a pair of pilot bosses formed thereon and said second printed wire board having a pair of cooperating pilot apertures therein for locating said second printed wire board in a predefined position on said mounting flange so that the optical center point of said chip is registered with said optical axis of said optical housing, said mounting flange and said second printed wire board having at least one pair of cooperative screw holes for receiving a mounting screw to fasten said printer wire board on said mounting flange.

10. Optical reader apparatus for reading MICR data on a check, said apparatus comprising:

housing means defining a check transit slot having an optical data window at a prearranged position within said check transit slot, said check transit slot being adapted for hand swiping of a check therethrough; and optical reading means mounted within said housing for reading MICR data scanned on a check passing by said optical data window;

said housing means comprising a base member and a cover member which mounts over said base member to produce a complete housing unit, said cover member being molded with said check transit slot integral therewith and adjacent one edge thereof, said check transit slot having said optical data window formed in an inside center location thereof; and said optical reading means comprises
- a printed wire board adapted to mount at a prearranged position within said base member of said housing unit, and
- an optical reader assembly mounted at a prearranged location on said printed wire board and having a data input end received in said optical data window formed in said check transit slot of said cover member when said cover member is mounted over said base member with said printed wire board mounted thereon;

said check transit slot formed in said cover member having a door opening formed in a wall portion opposite said optical data window; and a door assembly is hingedly mounted in said door opening to swing between a closed check read position and an open cleaning position, said door assembly including a pressure spring member mounted on the inside thereof and extending into said check transit slot when said door assembly is in said closed check read position to form a portion of said check transit slot and thereby to urge a check passing through said check transit slot into good optical reading contact with said optical data window, said pressure spring member having a recessed central portion with a compensation member mounted thereon to provide a white reference background for said optical reader assembly.

11. Apparatus as claimed in claim 10, wherein said optical reader assembly comprises:

an optical housing formed by precision molding and having a base portion, a superstructure extending above said base portion for supporting optical components, and a cover member mounted over said superstructure for sealing said optical components in said superstructure;

said superstructure defining a data input end and a data output end thereof and having a mounting frame portion formed at said data input end, said mounting frame portion carrying an optical window member in a prearranged slot therein, said mounting frame portion being formed to be received in said optical data window of said check transit slot, said superstructure further having a central slot formed therein between said data input end and said data output end and carrying an aperture member and a lens member, said superstructure further having a mounting flange formed at said data output end with a detector window formed therein and carrying an optical detector assembly on said mounting flange, said optical housing having a pair of illumination windows located behind said mounting frame portion for receiving a pair of illumination means to shine light through said optical window on a check passing through said check transit slot;

said base portion having a pair of pilot bosses formed on a bottom surface thereof and cooperating with a pair of pilot holes in said printed wire board to define said prearranged mounting location for said optical reader assembly on said printed wire board;

said base portion and said printed wire board each having at least one cooperative screw hole formed therein for receiving a mounting screw to fasten said optical reader assembly to said printed wire board;

a pair of illumination means being mounted in prearranged locations on said printed wire board so as to be received in said illumination windows of said optical housing when said optical reader assembly is mounted thereon, said illumination means shining light through said optical window member on said compensation member in absence of a check in said check transit slot;

said pressure spring member urging a portion of a check transiting said check transit slot against said optical window member of said optical reader assembly to ensure reproducible focused image presentation to said optical detector chip.

12. Apparatus as claimed in claim 11, wherein said cover member has a plurality of indicating light apertures formed in a top surface thereof at a location adjacent said optical data window in said check transit slot, and an indicator light assembly is mounted on top of said optical housing of said optical reader assembly and includes a plurality of indicator light means and associated light piping means having one end of said light piping means received in an associated one of said indicating light apertures.

* * * * *